United States Patent [19]

Brady

[11] Patent Number: 4,610,090
[45] Date of Patent: Sep. 9, 1986

[54] MEASURING INSTRUMENT

[76] Inventor: Thomas Brady, 3514 Tree La., Kingwood, Tex. 77339

[21] Appl. No.: 656,649

[22] Filed: Oct. 1, 1984

[51] Int. Cl.⁴ .............................................. G01B 5/02
[52] U.S. Cl. ............................... 33/148 R; 33/148 E
[58] Field of Search ............. 33/147 K, 148 R, 148 E, 33/164 D, 167

[56] References Cited

U.S. PATENT DOCUMENTS

| 2,337,509 | 12/1943 | Todd | 33/148 R |
| 2,791,033 | 5/1957 | Walters | 33/148 E |
| 4,397,092 | 8/1983 | Marcyan | 33/148 R |

FOREIGN PATENT DOCUMENTS

| 840924 | 6/1952 | Fed. Rep. of Germany | 33/148 R |
| 876159 | 5/1953 | Fed. Rep. of Germany | 33/147 K |
| 896117 | 11/1953 | Fed. Rep. of Germany | 33/148 R |
| 118670 | 4/1947 | Sweden | 33/148 E |

*Primary Examiner*—Richard R. Stearns
*Attorney, Agent, or Firm*—Norvell & Associates

[57] ABSTRACT

A precision caliper gage to measure an internal or external dimension of a body. The caliper gage provides for quick and easy attachment of measuring components and for automatic interplanar alignment of measuring components as they are attached to the gage. A mainframe has a portion parallel to a longitudinal plane and is adapted for attachment of a pivot member in alignment with the longitudinal plane. A first measuring arm is mountable on the pivot also in alignment with the longitudinal plane. A second measuring arm is mountable on the mainframe in alignment with the longitudinal plane and cooperates with the first arm to measure a dimension. A measurement indicator is mountable on the mainframe with a measurement-responsive indicator stem in alignment with the longitudinal plane and responsive to measuring movement of the first measuring arm. The measurement indicator is positioned in a manner that the linear distance along a base line from a vertical line through a measuring point on the first measuring arm to a vertical reference line through the pivot member is proportional to the linear distance along the base line from the vertical reference line through the pivot member to a vertical line through a measurement-responsive point on the indicator stem.

3 Claims, 17 Drawing Figures

MEASURING INSTRUMENT

BACKGROUND OF THE INVENTION

This invention relates to measuring instruments, and more particularly, to measuring gages adaptable to measure a dimension of a body, and still more particularly, to a precision caliper gage adaptable to measure interior or exterior dimensions of a body.

Precision caliper gages have been known and widely used for a long time in many countries and for many industrial applications.

However, as I have cited below, previous measuring calipers were designed to perform a single type of measurement, as, for example, a measurement of the wall of a tube. Or, in some cases, the instrument may include two sets of interchangeable arms so that the device may measure an interior or an exterior dimension of a cylinder. As I have found through long experience, and as is readily seen in the following references, the capabilities of the measuring calipers previously designed are extremely limited.

Some of the typical measuring calipers which I have found in the prior art are described in the following U.S. Pat. Nos.:

| | | |
|---|---|---|
| 1,060,111 | Muncaster | April 29, 1913 |
| 1,967,618 | Jazwieck | July 24, 1934 |
| 1,990,138 | Schuster | February 5, 1935 |
| 2,083,373 | Hardesty et al | June 8, 1937 |
| 2,553,574 | Gray | May 22, 1951 |
| 2,634,505 | Petch | April 14, 1953 |
| 2,785,471 | Aldeborgh et al | March 19, 1957 |
| 2,791,033 | Walters | May 7, 1957 |

SUMMARY OF THE INVENTION

Therefore, the primary object of my invention is to provide a caliper gage adaptable for numerous purposes which is inexpensive, easy to manufacture, and easy to use.

Another object of my invention is to provide a caliper gage which is capable of easy, quick, and simple adaptation to make various precision measurements.

Another object of my invention is to provide a caliper gage which is adaptable for the interchange of many measurement attachments to give the instrument a wide variety of applications.

Still another object of my invention is to provide a precision caliper gage which is capable of accepting measurement attachments for specific purposes.

Still another object of my invention is to provide a precision caliper gage which will retain precision measuring capabilities with any attachment components to which it may be adapted.

Still another object of my invention is to provide a precision caliper gage which will make precision measurements over a wide range of measurement ranges and yet is rugged and is a durable instrument.

Still another object of my invention is to provide a precision caliper gage which provides automatic alignment for any measuring attachments.

In summary, I have designed a precision caliper gage adapted to receive a wide variety of measurement attachments which may be easily prepared and interchanged and, upon attachment, are automatically in proper measuring alignment.

As I noted briefly above, I had been aware through many years of experience with industrial applications, that precision caliper gages had always been designed for a single "type" of measurement. A particular gage may provide a single "type" of measurement by means of measuring the interior and exterior dimensions of a cylinder by the interchanging of the caliper measuring arms. For example, as in U.S. Pat. No. 2,634,505, interior and exterior measurements are made by the interchange of fingers 60 and 70 with fingers 80 and 90. Or, as in U.S. Pat. No. 2,785,471, which describes the interior and exterior measurements as being done with caliper arms 25 and 26, and 61 and 62.

Gages now on the market require special accessories designed especially for that particular gage by the manufacturer himself, which accessories are usually complex configurations, singular and specific shapes capable of being made only by the manufacturer, and which are components having extreme limitations. Also, usually the components made available by the gage manufacturer require specific attachment components such as special nuts, bolts, screws, and measuring points, all designed by that manufacturer for extremely close tolerances.

My invention is a precision measuring instrument developed during many years of experience with the applications for which the instrument is used, and through experience with the current measuring instruments now on the market for such applications.

My instrument embodies the concept of a mainframe to which all attachments are easily and quickly fastened. My concept permits me to provide a precision gage which has simplicity, convenience, and few moving parts despite its wide adaptability.

At the same time, my concept of a mainframe for my instrument allows me to construct my mainframe to include a point within a plane with which plane all measuring components are in automatic alignment upon their proper attachment to the mainframe.

The concept of a horizontal mainframe with its rigidity enables me to construct a gage with a long and slim profile which has the stiffness to measure close tolerance dimensions far into narrow bores. Most gages have bodies which will not even enter a bore for measurement.

Further, as I have shown in the preferred embodiments of my invention, I have designed the mainframe of my caliper gage to permit the measuring components to be removably attachable to a side of that mainframe which greatly simplifies the alignment of the components and assures the automatic alignment of these components as they are attached to the mainframe. 1 have shown many different embodiments of my invention, but these are still only a brief summary of the possible attachmeants which might be available for use with a measuring instrument according to my concept and design.

Essentially, my invention is an improved precision caliper gage for measuring the following types of features:

a. Bores, such as the inside diameter of tubes, machined cylinders, etc.

b. Grooves in bores, such as O-ring grooves, grind reliefs, etc.

c. Outside diameters of all kinds.

d. Wall thicknesses of tubes, machined cylinders, plates, etc.

e. Roundness and concentricity of cylinders, whether inside or outside dimensions.

f. Pitch diameter of threads and gears.

g. Width of linear configurations, such as slots and dovetails.

These and other objects and advantages of my invention will become apparent from the accompanying drawings and description and claims in which I describe my invention as a caliper gage comprising a mainframe having a point within a longitudinal plane, with the mainframe adaptable to receive attachably thereto means for measuring dimensions, including: a pivot member positionable on the mainframe in parallel alignment with the longitudinal plane, a first measuring means mountable on the pivot member in parallel alignment with the longitudinal plane, a second measuring means mountable on the mainframe in parallel alignment with the longitudinal plane, with the first and second measuring means adaptable to cooperate to measure a desired dimension; and indicator means mountable on the mainframe in alignment with the longitudinal plane to be responsive to one of said measuring means, the indicator means positionable in a manner that the linear distance along a base line from a vertical line thru a measuring point on the first measuring means to a vertical reference line thru the pivot member is proportional to the linear distance along the base line from the vertical reference line thru the pivot member to a vertical line thru a measurement responsive point on the indicator means.

BRIEF DESCRIPTION OF THE DRAWINGS

FIG. 4b is an end view along the lines 4b—4b of the attachment shown in FIG. 4a.

DESCRIPTION OF THE PREFERRED EMBODIMENTS

Figure 1:
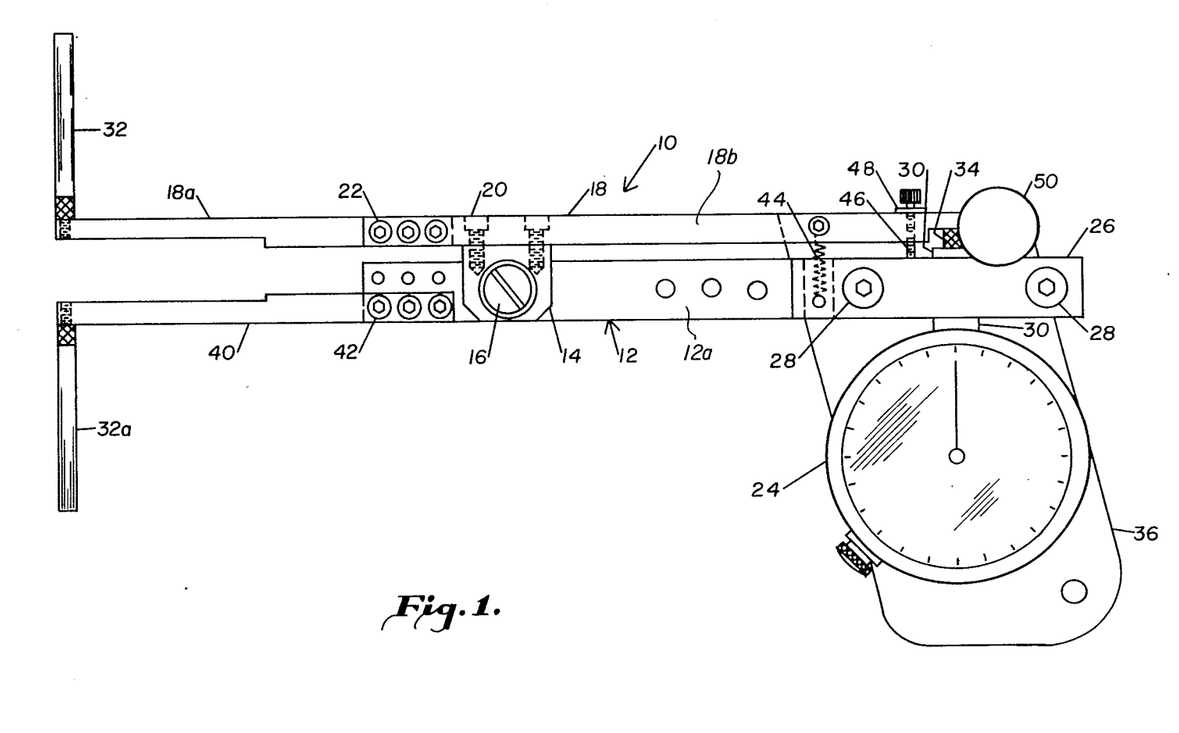
FIG. 1 is a side elevational view of a measuring instrument according to my invention.

FIG. 1 describes a measuring instrument 10, generally, according to my invention, as it would be assembled, adjusted, and in position to measure an internal diameter or bore of a cylinder, pipe, or tube, or an internal dimension of any type.

My measuring instrument 10, or caliper gage, to which I may also refer as simply, gage, is constructed basically upon a mainframe 12, generally, which I have developed over many years of experience with measuring instruments. I have developed my mainframe type of construction because it is a simple, rugged, type of construction which is adaptable to receive many types of attachments of standard components, and provides a rigid longitudinal member which allows the gage to have a slim profile in order to extend far into relatively small bores. Most importantly, with my mainframe concept, all attachments are automatically in alignment. Main frame 12 has at least one elongated planar side surface 12a.

Figure 11:
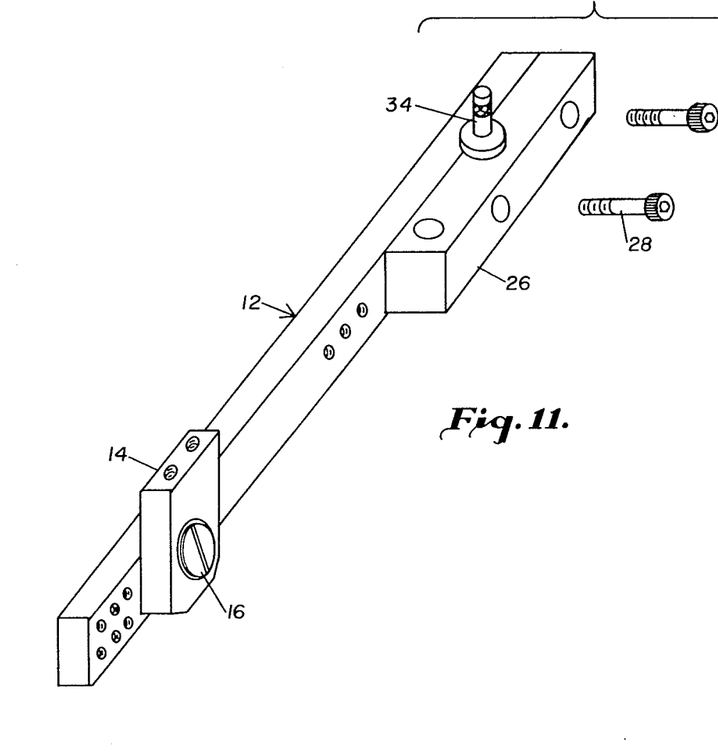
FIG. 11 is a perspective view of a mainframe component of a measuring instrument according to my invention.

For greater clarity and ease of understanding, I have shown mainframe 12 in perspective in FIG. 11 with only a few components attached, merely for the sake of giving a clear understanding of the attachment geometry of the gage.

Figure 2:
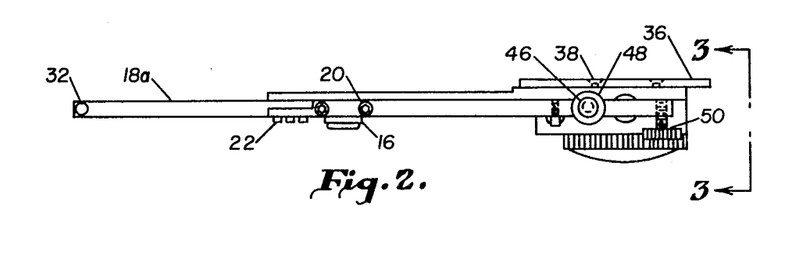
FIG. 2 is a top view of the measuring instrument shown in FIG. 1.

I have mounted a pivot housing 14 on mainframe 12 by means of a precision bearing 16. The use of a precision bearing 16 is an important feature of my invention, because a bearing of this type eliminates side play and thus increases accuracy of measurement. The axis of bearing 16 is perpendicular to planar side surface 12a. Then, to pivot 14 I have mounted a moving arm or frame 18, generally, with bolts 20. Moving arm 18 thus moves in a plane parallel to planar surface 12a. In FIGS. 1 and 2 I show one form of moving arm 18 which includes a detachable portion 18a, securable to arm 18 by means of bolts 22. I have thus provided for easy and quick attachment of modified components as desired by the user. Moving frame 18 preferably has a planar side face 18b that is parallel to planar side face 12a of main frame 12.

I have provided a dial indicator 24 secured to mainframe 12 by a clamp 26 held in position against planar surface 12a by bolts 28 cooperating with mainframe 12 to secure indicator neck 30 between clamp 26 and mainframe 12. Dial indicator 24 is of a conventional type which is easily available. No expensive or special dial indicator is required. As one may readily see, an adjustment of indicator 24 may easily be made, if necessary, by loosening bolts 28 and sliding the indicator 24 up or down as needed to compensate for any other adjustment of other components.

FIG. 1 describes one embodiment of measuring tips, an upper measuring tip 32 and a lower measuring tip 32a. I have shown several different versions of a measuring tip, and I am providing that a measuring tip may be modified as to length, type of end surface, and type of connection with moving arm or frame 18, depending upon the type of measurement which needs to be performed by the instrument. I have shown in other figures these other modifications.

For one embodiment, as one is shown in FIG. 1, the linear distance from the end of movable measuring tip 32, for example, to the centerline thru bearing 16 is equal to the distance from the centerline thru bearing 16 to the centerline thru indicator stem 34. I am describing, of course, a linear distance which is parallel to the arm of the instrument and centerlines which are perpendicular to that parallel linear distance. For simplicity, the user of my instrument may use attachments which establish the centerline thru the bearing 16 as a mid-point between tip 32 and indicator stem 34.

However, I have designed my measuring instrument to have such a versatility that, in many instances, the user may choose attachments which will establish his own chosen proportion for the distances between a measuring tip, bearing 16, and indicator stem 34. This choice will be apparent from the other figures I have shown.

A guard 36 is secured to mainframe 12 by bolts 38, as shown in FIG. 2. Guard 36 provides both a means for protecting dial indicator 24 and a means for holding the measuring instrument.

I have shown in FIG. 1 one embodiment of a fixed arm 40 held in position securely against mainframe 12 in parallel relationship to planar surface 12a by bolts 42. I refer to arm 40 as a fixed arm because it is held motionless in regard to mainframe 12 as compared with moving arm 18. As I have stressed, the configuration of this fixed arm may be varied depending upon the type of measurement the user wishes to make. Since fixed arm 40 is attached to the face of mainframe 12, it is, as shown, in automatic alignment with moving arm 18a. It is this plane mounting which provides automatic alignment of the assembled components.

Figure 5:
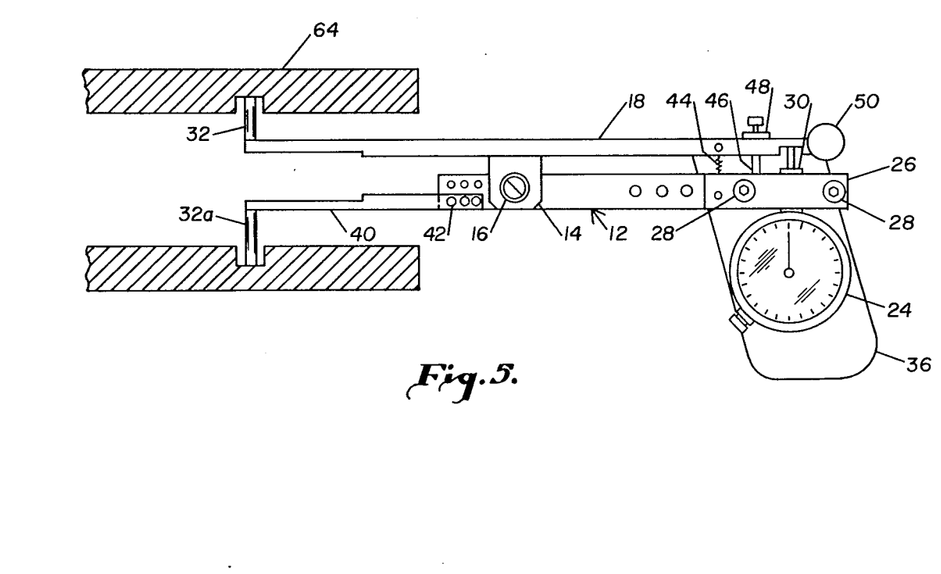
FIG. 5 is a side elevational view of a measuring instrument as shown in FIG. 1 showing a manner of measuring an internal diameter of a pipe, shown in section, and illustrating the adaptability of my instrument to reach far into small bores.

As I show in FIGS. 1 and 5, measuring tips 32 and 32a are adaptable to measure an internal distance, such as a bore.

For interior measurements, such as a measurement of a bore, I have provided a spring 44 to urge the rear of moving arm 18 downward toward mainframe 12 so that moving arm 18 presses against indicator stem 34. Then, of course, measuring tips 32 and 32a are pushed apart as may be understood as shown in FIG. 1.

Then, for an exterior measurement, such as for the measurement of a thickness, the measuring tips are reversed in direction, as I show in later figures, and spring 44 is unhooked, so that moving arm 18 is urged away from mainframe 12 by the spring pressure interiorly of indicator neck 30 which urges indicator stem 34 radially outwardly from dial indicator 24.

Adjustment bolt 46 serves as a fine adjustment for the measuring instrument and acts as a limit stop to set the potential travel of moving arm 18 within the range of the instrument setting. Bolt 46 also prevents excessive shock to indicator stem 34. Then, lock nut 48 may be used to lock bolt 46 at its chosen setting.

A knob 50 secured to moving arm 18 provides an easy and convenient means for moving the arm 18 as necessary during use. For example, to insert the measuring tips into a bore, or between two plates, knob 50 may be raised by applying thumb pressure upwardly from the underside of knob 50, thus bringing the measuring tips closer together. When the thumb pressure is released, the measuring tips move outwardly to contact the work.

In reverse, for outside measurements, when the proper attachments are used and proper adjustments are made, knob 50 is depressed by finger pressure so that the measuring tips will be in position outside the item to be measured.

Figure 3:
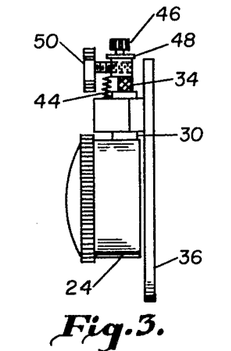
FIG. 3 is a rear elevational view of the measuring instrument shown in FIG. 1.

FIGS. 2 and 3 more clearly show the relationship of the components described in FIG. 1.

Figure 4:
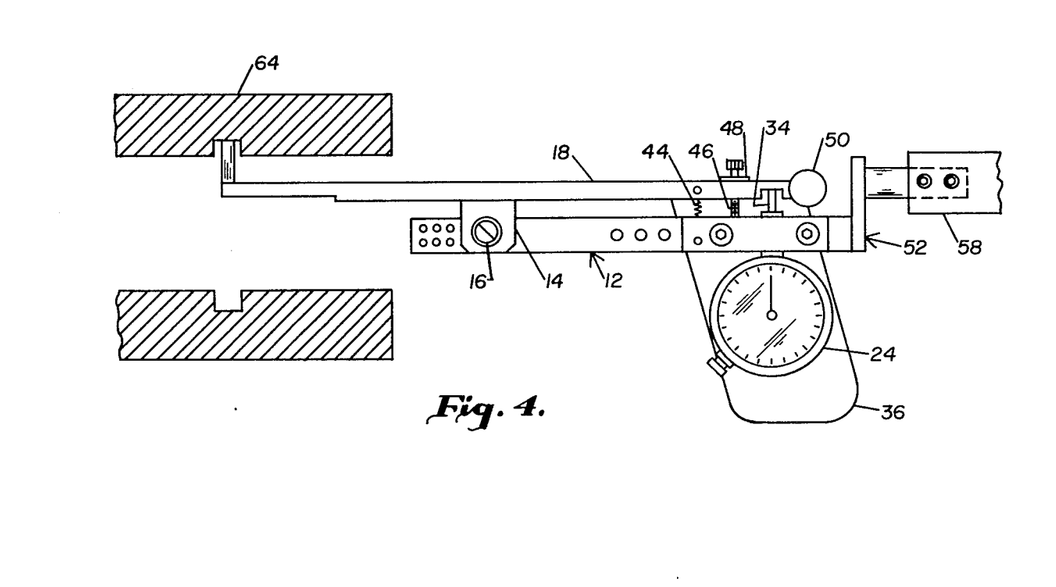
FIG. 4 is a side elevational view of a modified measuring instrument according to my invention.
Figure 4A:
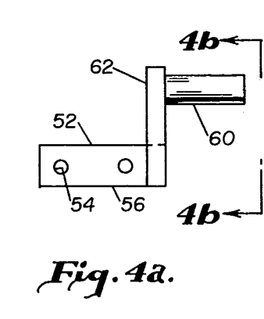
FIG. 4a is a side elevational view of an attachment component of the measuring instrument shown in FIG. 4 which adapts the measuring instrument to fit into a machine tool.
Figure 4B:
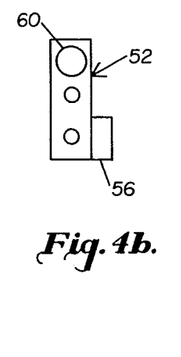

FIG. 4 describes one useful alteration of my measuring instrument which may be made for measuring concentricity of a bore or groove. A concentricity attachment 52, generally, is secured to the back of mainframe 12 by bolts (not shown) passing thru holes 54 in portion 56, as shown in FIGS. 4a and 4b. In one manner of use, the attachment 52 may be held in a lathe tailstock 58, shown in partial, by the securing therein of spud 60 secured thru extension portion 62 attached to portion 56. Then, as I have shown in FIG. 4, the fixed arm 40 is removed, since it is unnecessary for this type of measurement, and moving arm 18 is inserted into the pipe or tubing to be measured, as shown in partial by pipe 64. Moving tip 18 contacts the interior surface of the pipe 64 as the pipe 64 is rotated, and any eccentricity or out-of-round will be transmitted to indicator stem 34 and dial indicator 24.

And, again, I wish to emphasize that I am able to adapt my gage to measure far into a bore, even to an extent where guard 36 would prevent further entry into the bore.

Figure 6:
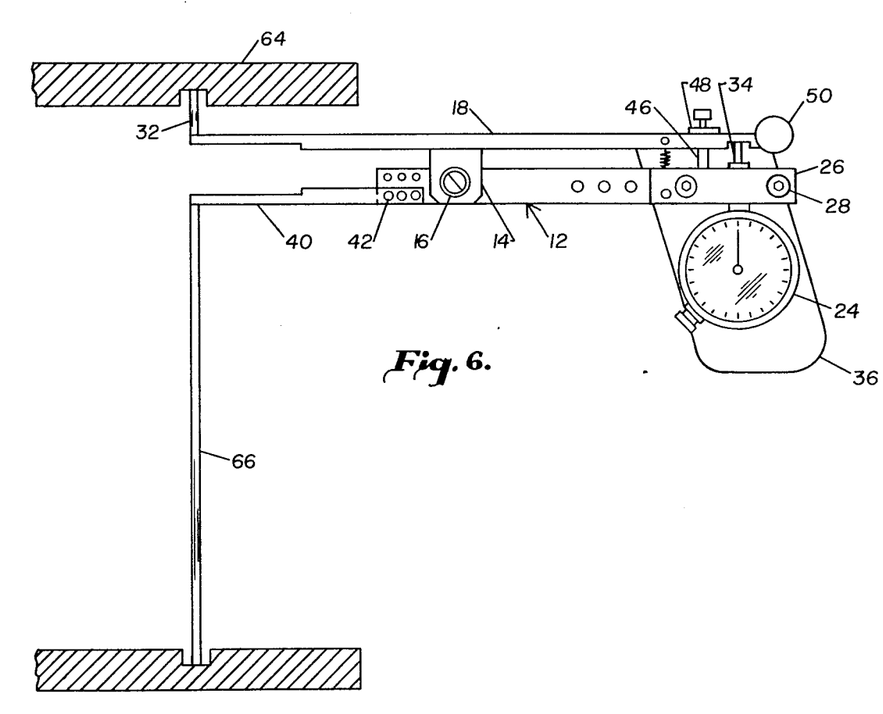
FIG. 6 is a side elevational view of a measuring instrument, similar to the one shown in FIG. 1, but adapted to measure an internal diameter of a larger pipe or tube, shown in section.

FIG. 6 describes a modification of my measuring instrument 10 for use in measuring very large diameter grooves or bores. In this modification I have simply been able to replace a lower measuring tip 32a by a much longer measuring tip 66.

Figure 7:
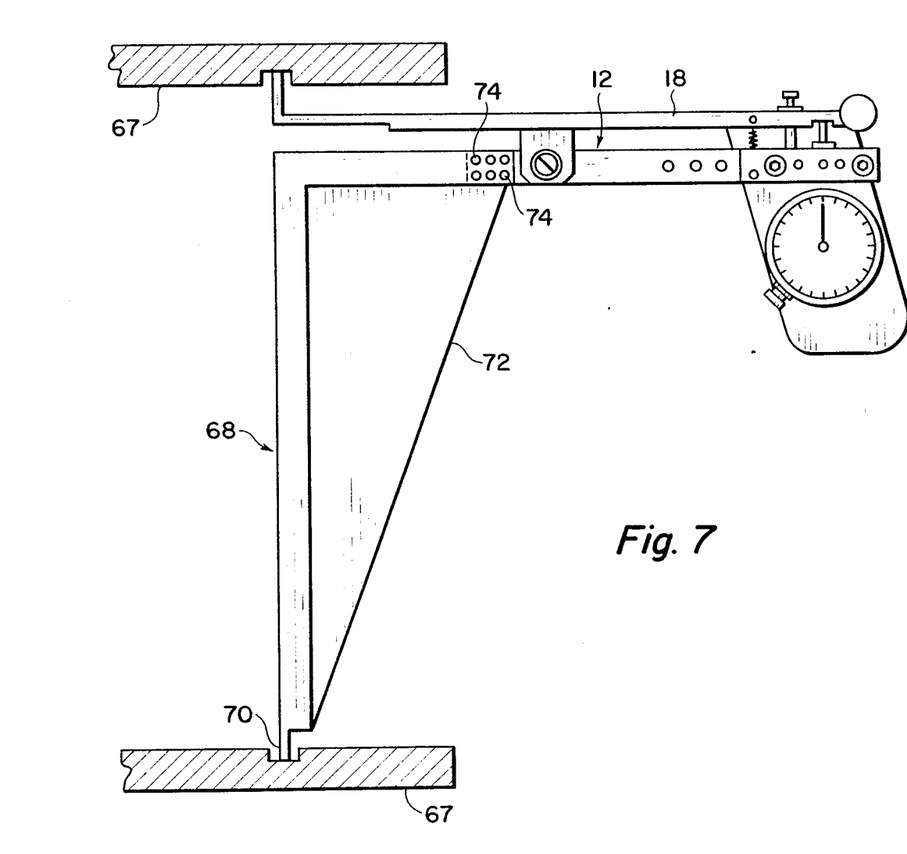
FIG. 7 is a side elevational view of another modified form of my measuring instrument, describing a version which is adaptable to measure very large diameters, bores, or dimensions.

In FIG. 7 I have shown another modification of my measuring instrument 10 for measuring even larger internal diameters or grooves, as in a large tube 67 (shown in partial), by replacing fixed arm 40 by an even larger measuring component 68, generally, which includes a measuring tip 70 and gusset 72, which greatly stiffens the arm as needed for very large work.

Figure 8:
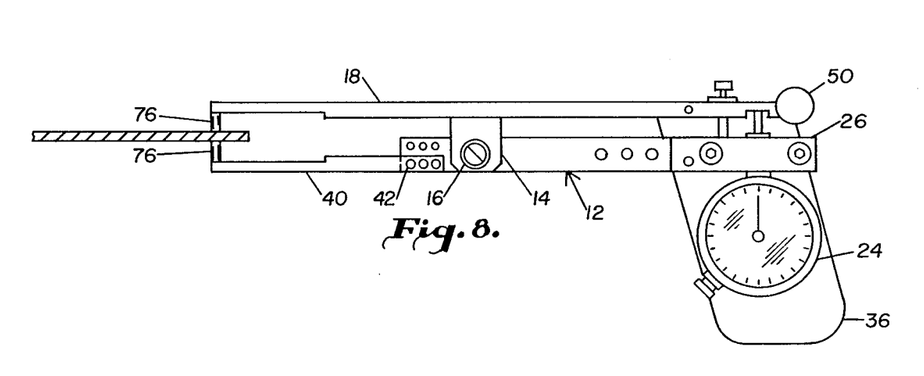
FIG. 8 is a side elevational view of another modified form of my measuring instrument describing a version which is to measure small outside diameters or thicknesses.

In FIG. 8 I have described a means of adapting my measuring instrument 10 for measuring small thicknesses, such as a thickness of a plate or paper, etc. As I suggested above, I have designed my measuring instrument to be adaptable for this purpose by reversing the measuring tips, and as I show, I have provided small measuring tips 76. Then, in operating my instrument in this manner, spring 44 is unhooked or removed so that the pressure of the spring actuating the indicator stem 34 will move radially the moving arm 18 for this measurement.

As is well-known in operating a measuring instrument with an indicator dial, the instrument is first calibrated with a known precision gage or form of measurement, or by comparison with a known dimension, and the measuring instrument measures essentially a difference in measurement.

Figure 9:
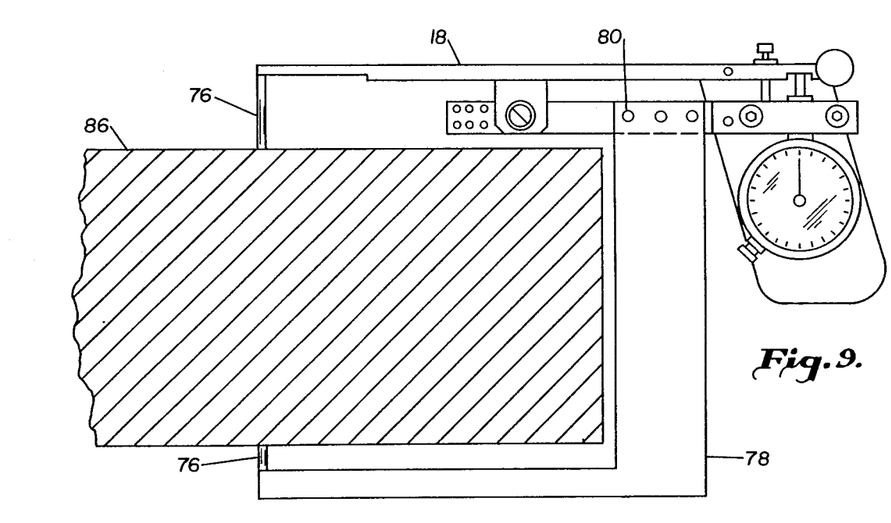
FIG. 9 is a side elevational view of another modified form of my measuring instrument describing a version which is adaptable to measure very large thicknesses at points which are difficult to reach.

FIG. 9 describes another modification of my measuring instrument which may be adaptable to measure extremely large external dimensions or diameters with a greatly extended length of reach for the instrument. I have provided an extension member 78, which is secured at a more remote position on mainframe 12, as shown, and held secure by bolts 80, and thus is automatically in line with arm 18. As I have shown, the measuring tips may be of any chosen length.

Figure 10:
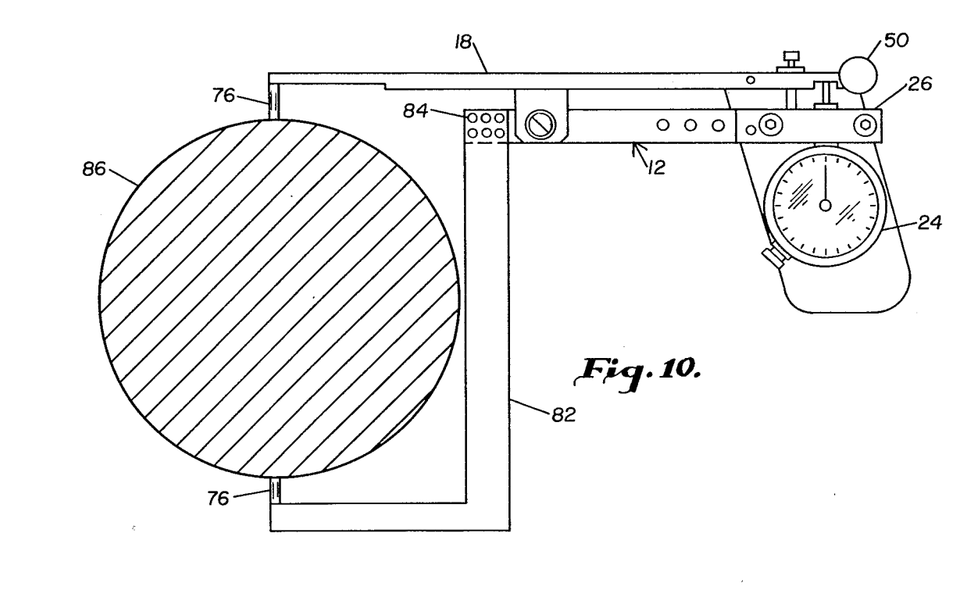
FIG. 10 is a side elevational view of another modified form of my measuring instrument which is another form adaptable to measure very large outisde diameters or thicknesses.

In FIG. 10 I have shown another modification for measuring large diameters. In this modification, I show extension member 82 secured to an end portion of mainframe 12 by bolts 84.

As shown, both modifications shown in FIGS. 9 and 10 are adaptable to measure an extremely large tube 86 (shown in fragmentary).

Figure 12:
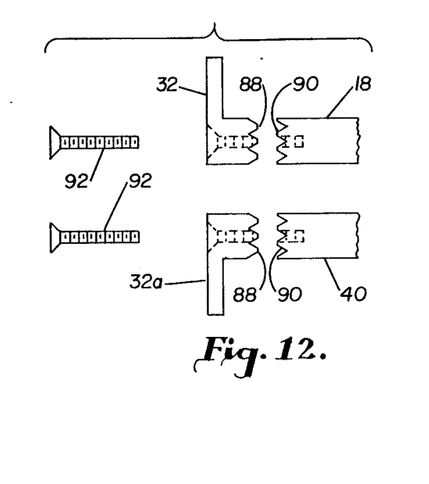
FIG. 12 is an exploded side elevational view, fragmentary, of one form of measuring tips of a measuring instrument according to my invention, showing one manner of connecting the components.
Figures 13, 14:
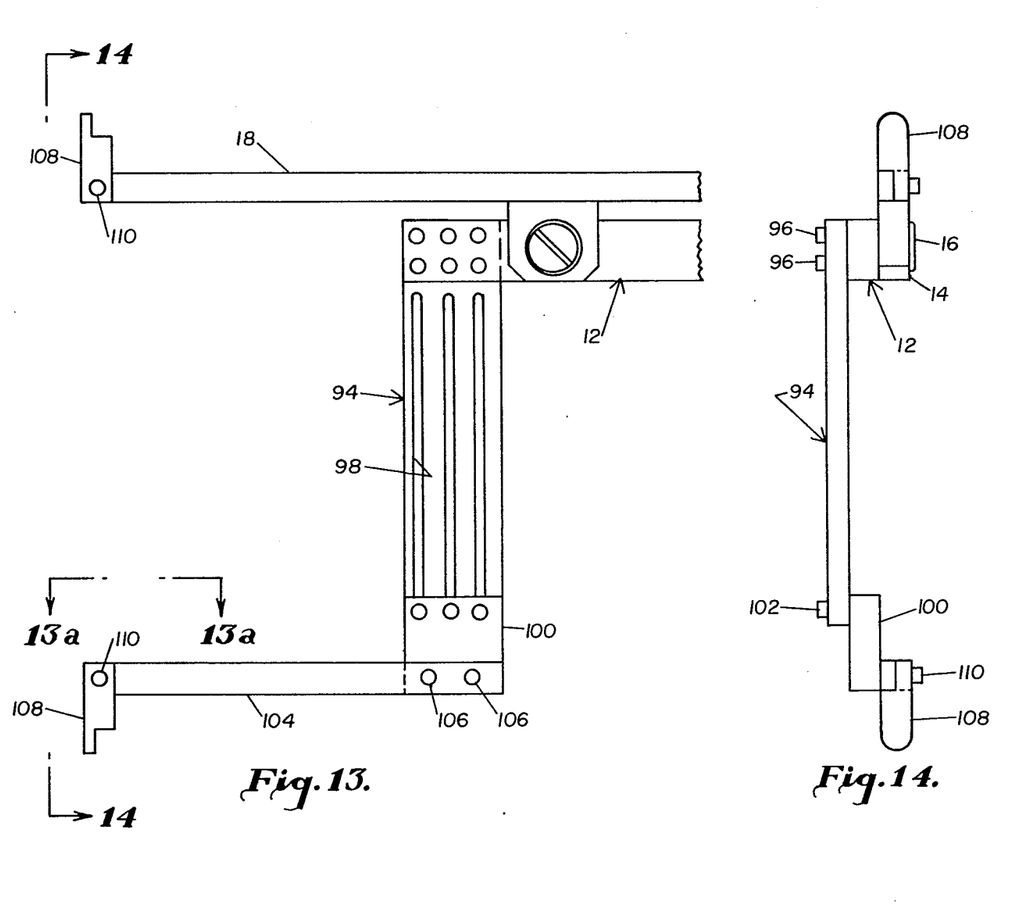
FIG. 13 is a side elevational view, in partial, of a portion of a modified form of a measuring instrument according to my invention showing one manner of adjustability for the measuring component.
FIG. 14 is an end view of the measuring instrument shown in FIG. 13 describing the manner in which the components fit.
Figure 13A:
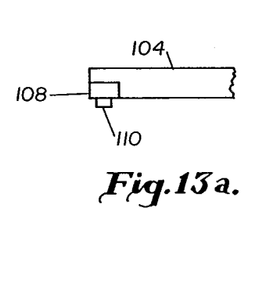
FIG. 13a is a view along the lines 13a—13a of FIG. 13 showing one manner of fitting the measuring components.

I have shown in FIG. 11 the major components and their configurations, including mainframe 12, pivot 14, and clamp 26. FIG. 12 describes another modification for securing measuring tips to the arms of the measuring instrument. I have shown arms 18 and 40 and measuring tips 32 and 32a to include serrations 88 and 90, as held in position with bolts 92. FIGS. 13, 13a, and 14 describe another modification of the measuring instrument 10 of my invention which particularly shows a means of providing for adjustable extension of the instrument where necessary. An extension member 94, generally, secured to mainframe 12 by bolts 96, and which includes a series of slots 98, provides means for attachment thereto of an additional extension member 100 by bolts 102. A measuring arm 104 is secured to extension member 100 by bolts 106. A measuring tip 108 is secured to arm 104 by bolts 110. As can easily be seen, this arrangement provides the alignment of the two measuring tips. As may also be seen, these figures describe another geometry of the connection for the measuring tips.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A caliper gage comprising an elongated main frame defining at least one elongated planar side surface; a pivot bearing housing having a planar exterior surface; means pivotally mounting said pivot bearing housing to said main frame for oscillation about an axis perpendicular to said one planar surface of said main frame, whereby said planar exterior surface overlies said main frame and pivots in a plane parallel to said one planar surface; an elongated secondary frame; means for detachably securing a medial portion of said secondary frame to said planar exterior surface of said pivot bearing housing, whereby said secondary frame overlies said main frame and is pivotally movable in a plane parallel to said one planar surface of said main frame; a first caliper leg secured to an end portion of said one planar side surface of said main frame; a second caliper leg secured to an end portion of said secondary frame and cooperable with said first caliper leg to measure a desired dimension on a workpiece, thereby pivoting the other end of said secondary frame relative to the other end of said main frame; and indicator means secured to said other end of said main frame and having a linearly movable actuating stem engaging the other end of said secondary frame; said indicator means being secured to said other end of said main frame so that said actuating stem is shifted in a plane parallel to the plane of said one planar surface of said main frame and by an amount representing a selected ratio to the separation of said caliper legs.

2. A caliper gage pursuant to claim 1 wherein said caliper legs are respectively removably attached to said main frame and said secondary frame, whereby said caliper legs may be selectively positioned to measure internal or external dimensions of a workpiece.

3. A caliper gage pursuant to claim 1 wherein each of said caliper legs comprises an elongated base element and a measuring tip support rigidly secured to said elongated base element in perpendicular relationship thereto; said elongated base elements being respectively removably secured to adjacent ends of said main frame and said secondary frame.

* * * * *